Patented Feb. 12, 1946

2,394,536

UNITED STATES PATENT OFFICE 2,394,536

COMPOUNDED LUBRICATING OIL

George H. Denison, Jr., and Paul C. Condit, Berkeley, Calif., assignors, by mesne assignments, to California Research Corporation, San Francisco, Calif., a corporation of Delaware No Drawing. Application October 18, 1943, Serial No. 506,726

8 Claims. (Cl. 252—33.6)

This invention relates to new and useful compositions of matter comprising a hydrocarbon oil containing a new combination of stabilizing agents. More particularly, the invention involves compounded lubricants containing an antioxidant of the type represented by dialkyl thioethers and other organic sulfides and a stabilizer or activator of the type illustrated by zinc pentamethylene dithiocarbamate.

This application is a continuation-in-part of our copending application Serial No. 432,040 (filed February 23, 1942), now United States Patent No. 2,346,155, issued April 11, 1944.

The hydrocarbon oils compounded according to the invention are oils of lubricating viscosity and will usually be petroleum distillates or residua of suitable viscosity; e. g. paraffinic, naphthenic and mixed base lubricating oils including highly refined and moderately refined oils. However, synthetic oils such as oily olefin polymers, amyl naphthalene, etc., may be used.

The organic sulfides used may be represented by the formula

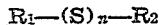

wherein $R_1$ and $R_2$ are aliphatic groups and $n$ is 1, 2 or 3. The groups $R_1$ and $R_2$ may be like or unlike; preferably they are both alkyl groups of at least eight carbon atoms apiece, but they may be shorter groups and they may be cycloalkyl or aralkyl groups. Examples of such sulfur compounds are: dibutyl, diamyl, butyl ethyl, dihexyl, dicyclohexyl, dioctyl, dilauryl, dicetyl and diparaffin sulfides, disulfides and polysulfides. A means of preparing these sulfur compounds comprises reacting a chlorinated hydrocarbon such as cetyl chloride or a mixture of chlorinated hydrocarbons such as chlorinated paraffin wax with sodium sulfide or sodium polysulfide in aqueous or alcoholic solution to replace all or part of the chlorine with sulfur. Examples of the preparation of aliphatic sulfides and polysulfides will be found in the general literature and examples of the preparation of sulfides from chlorinated paraffin wax will be found in Turner, U. S. Patents 2,124,598 and 2,192,700.

The dithiocarbamate used according to the invention is the salt of an acid having the formula:

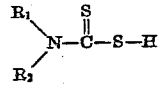

wherein both the R's are organic groups having sufficient carbon atoms to render the compound at least slightly soluble in oil. The R's may be like or unlike and they may be alkyl, cycloalkyl, aryl, alkaryl or aralkyl groups. The readiest method of preparation comprises reacting a secondary amine with carbon disulfide in aqueous or alcoholic caustic soda or caustic potash. General preparative methods are available in the literature. Preferably, there are used in accordance with the invention dithiocarbamates made by extracting cyclic petroleum nitrogen bases from cracked naphtha from California crudes and reducing the same (see Rutherford, U. S. Patent 2,302,655) and then reacting the reduced petroleum nitrogen bases with carbon disulfide in aqueous caustic alkali solution. The alkali metal dithiocarbamate thus obtained may be recovered from aqueous solution by crystallization, but as the polyvalent metal dithiocarbamates are preferred it will be the usual practice to add to the aqueous reaction mixture an aqueous solution of a salt of a polyvalent metal, e. g. calcium chloride or zinc sulfate, and precipitate the desired polyvalent metal dithiocarbamate. This may be purified by crystallization from alcohol solution.

Dithiocarbamates so prepared are herein called "petroleum base" dithiocarbamates. Examples of these and other dithiocarbamates which may be used in hydrocarbon oils in conjunction with the above mentioned sulfur compounds are sodium, potassium, calcium, zinc, cadmium and aluminum "petroleum base" dithiocarbamates; the same metal salts of dibutyl dithiocarbamic acid and the same metal salts of diphenyl and dicetylphenyl dithiocarbamic acids.

The proportion of organic sulfide in the finished oil may be as little as 0.05% but about 0.1% to 2% is preferred. The dithiocarbamates may likewise be present in amount as low as 0.05% but about 0.1% to 2% is preferred. In each case, percentages are by weight based on the finished oil. Concentrates containing from 5 to 50 percent each of organic sulfide and dithiocarbamate in mineral lubricating oil may also be prepared for later blending with more oil to produce a finished, compounded oil.

Among the advantages of the hydrocarbon oil-organic sulfide-dithiocarbamate composition of the present invention are increased resistance to deterioration of the oil caused by heat and oxidation; reduced corrosiveness of the oil to cadmium-silver and/or copper-lead types of alloy bearings; reduced sludging of the oil and reduced tendency of the oil to foul piston walls, piston rings and piston ring slots; and reduced tendency of the oil to cause or permit piston ring sticking.

The following test data show the cooperative relationship between the sulfide type of additive and the dithiocarbamate additive of the invention. The data are from an oxidation test particularly described in Industrial and Engineering Chemistry, vol. 28, page 26, 1936. The tests were carried out at 340° F. and the amount of oxygen absorption per 100 cc. of oil was measured at various time intervals.

| Base oil | Additives | Cc. oxygen absorbed/100 cc. oil in— | | | |
|---|---|---|---|---|---|
| | | 0.5 hour | 1 hour | 2 hours | 4 hours |
| Heavy white oil. | Nil | >2,000 | | | |
| Do | 1% dicetyl sulfide | >2,000 | | | |
| Do | 1% Zn N-pentamethylene dithiocarbamate | 45 | 65 | 75 | |
| Do | 1% Zn N-pentamethylene dithiocarbamate + 1% dicetyl sulfide | 5 | 7 | 10 | 14 |

While salts, more particularly polyvalent metal salts, of organo substituted dithiocarbamic acids are preferred, salts of organo substituted carbamic acids in general may be used in accordance with the invention.

As stated, polyvalent metal "petroleum base" dithiocarbamates are preferred as one of the compounding agents of the present invention. From the properties and reactions of these "petroleum base" dithiocarbamates as well as those of the cracked petroleum nitrogen bases from which they are derived, it is deduced that the "petroleum base" dithiocarbamates are predominantly one or more, probably a mixture of substances having the following structural formulae:

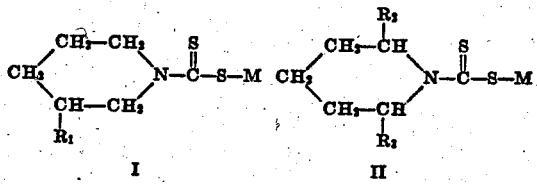

I      II

In the above formulae, $R_1$, $R_2$ and $R_3$ represent alkyl groups, which may be attached at the points shown or at other points on the piperidine ring, and the sum $R_2+R_3$ each contains an average of 5 carbon atoms.

As used in the appended claims the term "petroleum base" dithiocarbamate means a dithiocarbamate wherein the nitrogen forms part of a ring such as a piperidine ring, which ring contains one or more alkyl groups on the carbon part of the ring.

We claim:

1. A composition comprising a major proportion of a hydrocarbon oil, a small amount, sufficient to stabilize the oil against oxidation, of a compound having the formula $$R_1-(S)_n-R_2$$

wherein $R_1$ and $R_2$ are aliphatic groups and $n$ is a whole number from 1 to 3, inclusive, and a small amount not less than about 0.05% by weight based on the finished composition of a salt of a thiocarbamic acid containing an organic substituent.

2. A composition comprising a major proportion of a hydrocarbon oil, a thioether present in a small amount, sufficient to stabilize said oil against deterioration under oxidizing conditions and a small amount not less than about 0.05% by weight based on the finished composition of a salt of a thiocarbamic acid containing an organic substituent.

3. A composition comprising a major proportion of a hydrocarbon oil, a thioether present in a small amount sufficient to stabilize said oil against deterioration under oxidizing conditions, and a small amount not less than about 0.05% by weight based on the finished composition of a polyvalent metal salt of a thiocarbamic acid containing an organic substituent.

4. A lubricating oil comprising: a major proportion of a mineral oil of lubricating viscosity; about 0.1 to 2 percent by weight on the finished oil of an oil-soluble compound or mixture of oil-soluble compounds having the structure

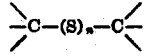

wherein $n$ is 1, 2 or 3 and the carbon atoms shown are aliphatic carbon atoms; and about 0.1 to 2 percent by weight on the finished oil of a polyvalent metal salt of a dithiocarbamic acid or mixture of dithiocarbamic acids having the formula

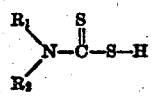

wherein $R_1$ and $R_2$ are oil-solubilizing groups of hydrocarbon structure.

5. A lubricating oil comprising a mineral oil of lubricating viscosity, about 0.1 to 2 percent by weight on the finished oil of an oil-soluble dialkyl thioether and about 0.1 to 2 percent by weight on the finished oil of polyvalent metal "petroleum base" dithiocarbamate.

6. The oil of claim 5, wherein said polyvalent metal is zinc.

7. A lubricating oil comprising a mineral oil of lubricating viscosity, about 0.1 to 2 percent by weight on the finished oil of the condensation product of chlorinated paraffin wax and an alkali metal sulfide and about 0.1 to 2 percent by weight on the finished oil of polyvalent metal "petroleum base" dithiocarbamate.

8. The oil of claim 7, wherein said polyvalent metal is zinc.

GEORGE H. DENISON, Jr.
PAUL C. CONDIT.